United States Patent [19]

Koike

[11] 4,026,598

[45] May 31, 1977

[54] WEATHER STRIP FOR MOTOR VEHICLE DOOR AND SEAL CONSTRUCTION

[75] Inventor: Syouichi Koike, Tokyo, Japan

[73] Assignee: Nissan Motor Co., Ltd., Yokohama, Japan

[22] Filed: Nov. 14, 1975

[21] Appl. No.: 632,106

[30] Foreign Application Priority Data

Nov. 16, 1974  Japan .................... 49-138986[U]

[52] U.S. Cl. ................................. 296/146; 49/495
[51] Int. Cl.² ...................... B60J 1/00; E06B 7/16
[58] Field of Search ............. 49/488, 495; 296/146

[56] References Cited

UNITED STATES PATENTS

| 2,687,914 | 8/1954 | Schrum ............................. 49/495 |
| 2,817,558 | 12/1957 | Kvbacka et al. ..................... 49/495 |
| 3,164,870 | 1/1965 | Harms et al. ....................... 49/495 |
| 3,939,608 | 2/1976 | Asakai et al. ....................... 49/495 |

Primary Examiner—Joseph F. Peters, Jr.
Assistant Examiner—Richard A. Bertsch

[57] ABSTRACT

In a door seal construction, a weather strip fitting in an upper mounting channel of an upper frame member on a door comprises a first lip portion yieldably engaging a jamb flange of a vehicle body structure and a second lip portion yieldably engaging an overhanging flange of the body structure.

11 Claims, 8 Drawing Figures

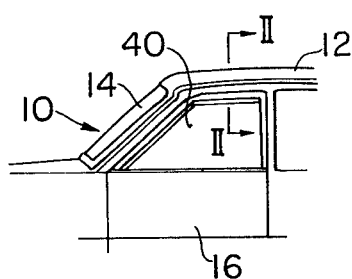
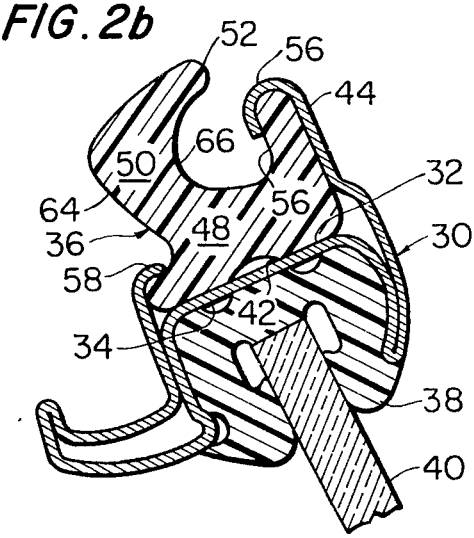
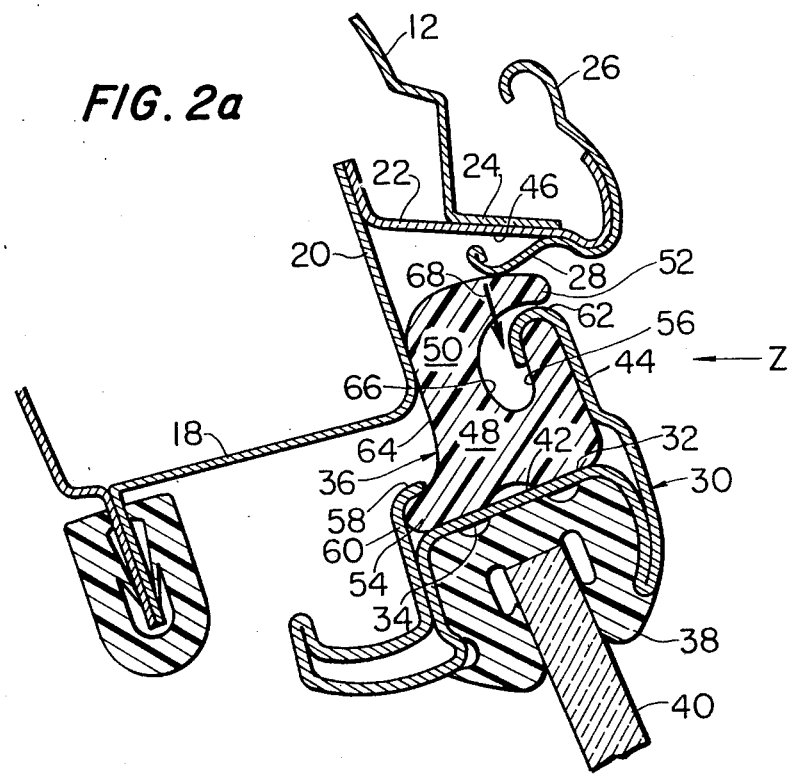

WEATHER STRIP FOR MOTOR VEHICLE DOOR AND SEAL CONSTRUCTION

The present invention relates to a weather strip for motor vehicle doors, and also relates to a motor vehicle door seal construction including the weather strip.

Conventionally a weather strip of an elongate resiliently deformable strip is attached to an upper door frame on a door or to the adjacent jamb structure of a vehicle body in order to seal the clearance space between the upper door frame and the adjacent jamb structure in the closed position of the door and also to serve as a cushioning member upon closing of the door. A known door seal construction uses a weather strip having a base portion and a lip portion extending from the base section. In this door seal construction, the weather strip is attached to an upper door frame member on a door with the base portion fitting in an upper mounting channel of the upper door frame member in such a manner that the lip portion will yieldably engage the adjacent jamb structure of a vehicle body when the door is closed. In another known door seal construction a weather strip is attached to a side roof rail structure in such a manner that its lip portion will yieldably engage inboard side of an upper frame member on a door when the door is closed.

The above door seal constructions necessiate high degree of precision in mounting a weather strip to yield an effective seal strength in the closed position of a door because the weather strip has only one lip portion. Unless the weather strip is mounted in position, the lip tends to be urged to a position to cause the seal to break due to vacuum created around the outer skin of a vehicle body during high-speed vehicle operation, causing "wind noise" to occur.

To improve the seal effect of a dual door seal construction is known. In this seal construction of a first weather strip is mounted in an upper mounting channel of an upper frame member on a door and has a lip portion yieldably engage the adjacent jamb flange, and a second weather strip is mounted on a transverse portion of a side roof rail structure below the jamb flange and has a lip portion yieldably engage an inboard side of the upper frame member. Although this seal construction effects a good seal even during high-speed vehicle operation, it is complicated in construction, resulting in the increase in cost and in assembling steps. Besides, since the second weather strip will bias the upper frame member laterally outwardly with respect to the door in addition to the first weather strip in the dual seal construction mentioned above, connection of the upper frame member with the door must be reinforced in accordance with the increased biasing force in the laterally outwardly direction with respect to the door.

An object of the present invention is to provide a door seal construction which uses as many existing parts of a conventional door seal construction that includes one weather strip as possible to reduce cost increase and which effects a good seal even during high-speed vehicle operation.

Another object of the present invention is to provide a door seal construction of the above character, which includes a single weather strip of a simple form.

Still another object of the present invention is to provide a weather strip for a door seal construction of the above character.

These and other objects, features and advantages of the present invention will become clearer from the following description in connection with the accompanying drawings, in which:

FIG. 1 is a partial side elevation view of a motor vehicle including a door seal construction in accordance with the present invention;

FIG. 2a is a partial sectional view taken along the line II—II of FIG. 1, showing a door seal construction according to first embodiment of the present invention;

FIG. 2b is a sectional view similar to FIG. 2a, showing a door in the opened position and a weather strip in the unstressed position;

Referring to the accompanying drawings, like reference numerals are used for like parts throughout all Figures.

Figure 3:
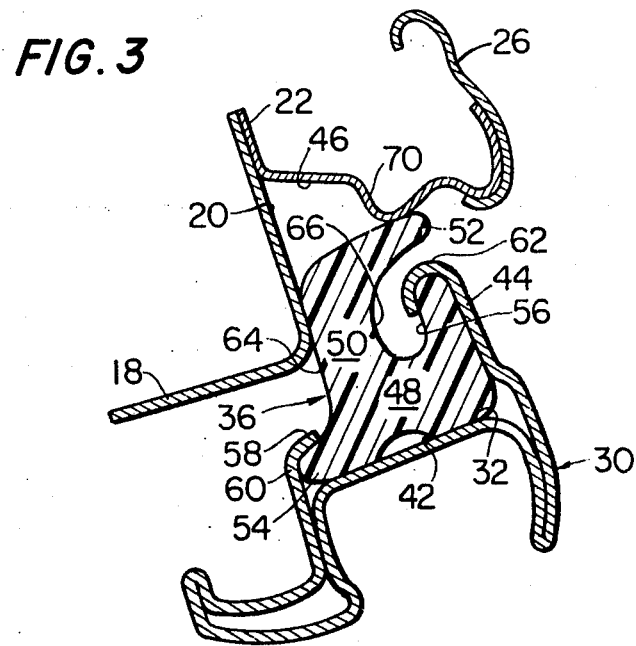
FIG. 3 is a sectional view similar to FIG. 2a showing a door seal construction according to second embodiment of the present invention.

Referring now in details to the drawings, and more particularly to FIG. 1, the numeral 10 denotes generally a motor vehicle including a door seal construction constructed in accordance with the present invention. The vehicle 10 includes a body structure such as a roof 12, a windshield 14 and a door 16. The door 16 is conventionally hinged at its forward edge to a body pillar section.

Referring now particularly to FIGS. 2a and 2b the vehicle body structure further comprises a transversely extending section 18 shaped to form a door opening closed by the door 16 and a jamb flange 20 extending upwardly from the transversely extending section 18. A roof drip 22 joined to the jamb flange 20 extends laterally outwardly from the jamb flange 20 to form in cooperation with the roof 12 a rain gutter 24. A drip moulding 26 is joined to the outer exterior surface of the gutter 24 and has a free edge 28 projecting inwardly toward the jamb flange 20. The door comprises an upper door window frame member 30. The upper frame member 30 includes oppositely opening upper and lower mounting channels 32 and 34 respectively receiving and retaining a weather strip 36 and a glass run channel 38. The glass run channel 38 receives a vertically movable window glass 40 of the door 16 (see FIG. 1). The upper mounting channel 32 has a transverse portion or base wall 42 arranged to lie adjacent the transverse section 18 in the closed position of the door 16, and also has an upwardly extending overlapping flange 44 adapted to overlie the jamb flange 20. The space between the flanges 20 and 44 is concealed by overhanging flange 46 formed by the roof drip 22.

The space between the flanges 20 and 44 as well as the clearance between the transverse portions 18 and 42 is sealed by the weather strip 36. The weather strip 36 extends along the transverse portion 42 between the jamb flange 20 and the overlapping flange 44 and includes an elongated resiliently deformable strip having a base portion 48 seated on the transverse portion 42 and on the laterally inner side of the overlapping flange 44, a first lip portion 50 and a second lip portion 52. The base portion 48 is formed with a bulbous bead 54 along one side or inboard side adjacent the bottom face thereof and with a bulbous bead 56 along the top face adjacent the opposite side or outboard side thereof. The bulbous bead 54 fits under a rib 58 formed integrally on a short flange 60 of the upper door frame member 30, while the bulbous bead 56 fits under a curved leg portion 62 integrally formed on the overlapping flange 44 in order to hold the base portion 48 of the weather strip 36 tightly against the transverse portion 42 and against the laterally inner side of the overlapping flange 44. The first lip portion 50 integrally formed along the top face adjacent the inboard side of the base portion 48 and extends laterally beyond the inboard side (see FIG. 2b). The first lip portion 50 has a sealing area along the side wall 64 thereof. The second lip portion 52 is integrally formed along the opposite side wall 66 of the first lip 50 and is directed laterally relative to the first lip portion 50.

When the door 16 is in the closed position as shown in FIG. 2a, the first lip portion 50 yieldably engages the jamb flange 20, while the second lip portion 52 yieldably engages the free edge 28 of the drip moulding 26. In this closed position since the edge 28 extends in substantially parallel with the transverse portion 42 of the upper frame member 30, upon yieldable engagement of the second lip 52 with the edge 28 the weather strip 36 will be biased toward the transverse portion 48 in a direction indicated by an arrow 68 (see FIG. 2a). When the door 16 is in the opened position as shown in FIG. 2b, the first lip 50 extends beyond the inboard side of the base portion 48 as shown and the second lip portion 52 assumes the illustrated position since the latter is integral with the former.

Referring to FIG. 3, the second embodiment of the present invention is illustrated. This embodiment is similar to the first embodiment shown in FIGS. 2a and 2b except that a second lip portion 52 yieldably engages a downwardly extending bead portion 70 formed on an overhanging flange 46 instead of extending an edge of a drip moulding 26 toward a jamb flange 20 under the overhanging flange 46.

Figure 4A:
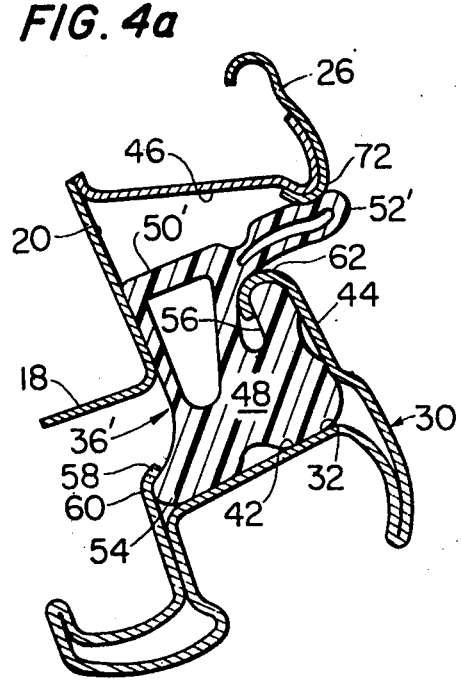
FIG. 4a is a sectional view similar to FIG. 2a, showing a door seal construction according to third embodiment of the present invention.
Figure 4B:
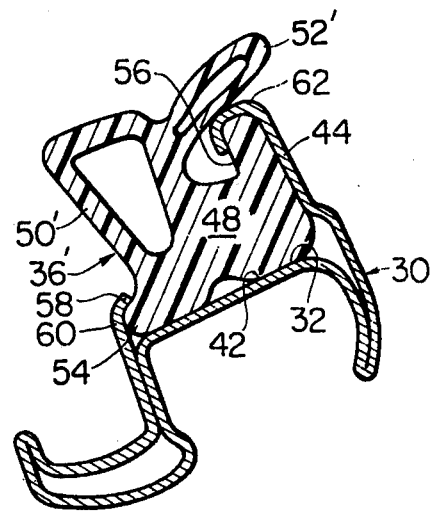
FIG. 4b is a sectional view similar to FIG. 4a, showing a door in the opened position and a weather strip in the unstressed position.

Referring to FIGS. 4a and 4b, the third embodiment of the present invention will be described. A weather strip 36' illustrated in these FIGS. is partly different in shape from the weather strip 36 of the first embodiment, so that portions of the former which are different in shape from the like portions of the latter are designated by the same reference numerals but with primes, respectively. The weather strip 36' shown in FIGS. 4a and 4b is different from the weather strip 36 in that a first lip portion 50' and a second lip portion 52' are hollowed respectively, in that a drip moulding 26 does not extend downwardly beyond an overhanging flange 46 and in that upon closure of a door 16 the second hollow lip portion 52' seal the space between a curved leg portion 62 on an overlapping flange 44 and a bead portion 72 formed on the drip moulding 26 in the closed position of the door 16 (see FIG. 4a), the second lip portion 52' engaging both the bead portion 72 and the curved leg portion 62. Although in this embodiment the second hollow lip portion 52' engages both the bead portion 72 and the curved leg portion 62 to improve the seal effect, it is not essential for the second hollow lip portion 52' to engage the curved leg portion 62.

Figure 5A:
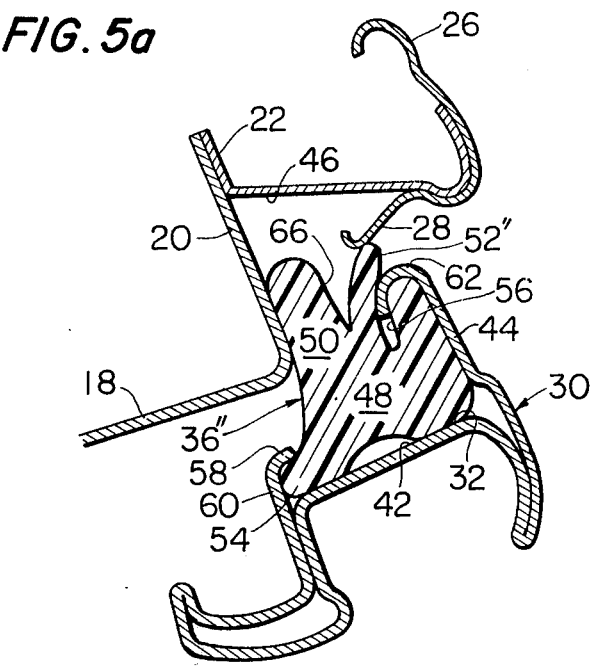
FIG. 5a is a sectional view similar to FIG. 2a, showing a door seal construction according to fourth embodiment of the present invention.
Figure 5B:
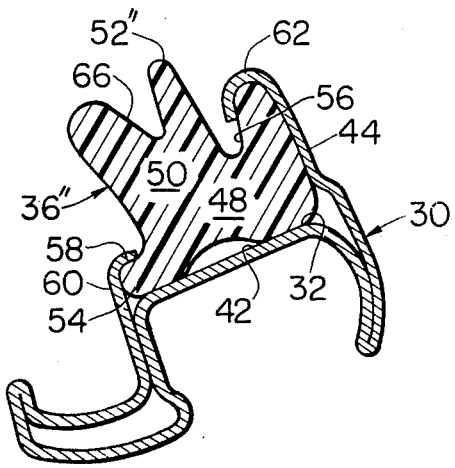
FIG. 5b is a sectional view similar to FIG. 5a, showing a door in the closed position and a weather strip in the unstressed position.

Referring lastly to FIGS. 5a and 5b, the fourth embodiment of the present invention will be described. A weather strip 36" in these Figures is partly different from the weather strip 36 of the first embodiment, so that portions of the former which are different from the like portions of the latter are designated by the same reference numerals but with two primes, respectively. The weather strip 36" is different from the weather strip 36 in that a second lip portion 52" is integrally formed on a side wall 66 of a first lip portion 50 adjacent the bottom thereof and extends somewhat in parallel with the first lip portion 50 to yieldably engage both with a free edge 28 of a drip moulding 26 and with a curved leg portion 62 of an overlapping flange 44 when a door 16 is in the closed position. Of course it is not essential to have the second lip portion 52 to engage the curved leg portion 62.

It will now be appreciated that since in addition to the first seal portion 50, 50' engaging the jamb flange 20, the second lip portion 52, 52', 52" is integral with the first lip portion and yieldably engages free edge 28 or bead 70, 72 positioned laterally outwardly from the jamb flange 20, more effective seal is provided with the seal construction in accordance with the present invention.

It will be understood that the second lip portion 52, 52', 52" is less subjected to the difference in pressure between the passenger compartment and pressure in area adjacent the outer skin of the vehicle because the second lip portion is not exposed directly to the passenger compartment pressure. Thus even when the vehicle is running at high speeds the possibility that the second lip portion 52, 52', 52" may be urged toward a position to break the seal is reduced in the door seal construction of the present invention. Besides should the seal by the second lip portion 52, 52', 52" be broken the first lip portion still would provide a seal. Therefore it will be appreciated that the seal effectiveness of the seal construction of the present invention is great even during high-speed engine operation.

It should be appreciated that engagement of the second lip portion with the free edge 28 or bead 70, 72 in the closed position of the door 16 will cause the weather strip 36, 36', 36" to be biased toward the base wall 42 of the upper mounting channel of the upper frame member 30, eliminating necessity to reinforce the connection of the upper frame member 30 with the door 16 so that the existing upper frame member and connection between the upper frame and the door used in the conventional door seal construction may be used without any modifications.

Because first and second lip portions are positioned in an area laterally outwardly of the jamb flange in the closed position of the door the possibility that drops of water may fall on the vehicle occupant upon leaving the vehicle by opening the door is eliminated.

As the door is open or closed in a direction of an arrow Z the free edge of the second lip portion will not be the turned over upon closing of the door.

What is claimed is:

1. The combination with a vehicle body structure including a body pillar to which a vehicle door is hinged and having an upper section having a transverse section defining one side of an opening for the door, a jamb portion for engagement by an overlapping flange on the door and an overhanging flange to conceal the space between the jamb portion and the overlapping flange; of:
a weather strip extending along a transverse portion of the door at the laterally inner side of the overlapping flange between the jamb portion and the overlapping flange, said weather strip comprising an elongated resiliently deformable strip having a base portion sealed on the transverse portion on the door and on the laterally inner side of the overlapping flange, a first lip portion extending from the base portion to yieldably engage the jamb portion and a second lip portion integral with the first lip portion to yieldably engage the overhanging flange.

2. In a motor vehicle, the combination of:
a vehicle body structure including a body pillar to which a vehicle door is hinged and having an upper section having a transverse section defining one side of an opening for the door, a jamb flange for engagement by an overlapping flange on the door and an overhanging flange to conceal the space between the jamb flange and the overlapping flange;
the overhanging flange including a surface extending therealong;
a weather strip extending along a transverse portion on the door at the laterally inner side of the overlapping flange between the jamb flange and the overhanging flange, said weather strip comprising an elongate resiliently deformable strip having a base portion seated on the door and on the laterally inner side of the overlapping flange, a first lip portion extending from the base portion to yieldably engage the jamb portion and a second lip portion integral with the first lip to yieldably engage the area of the over-hanging flange;
the surface being so constructed and arranged such that the yieldable engagement of the second lip portion with the surface biases the weather strip against the transverse portion on the door.

3. The combination as claimed in claim 2, in which a drip moulding for a rain gutter of the upper section of the vehicle body structure has a leg portion extending from the exterior into the space to form thereon the surface.

4. The combination as claimed in claim 2, in which a roof drip extending outwardly from the jamb flange to form the overhanging flange is formed with the surface.

5. The combination as claimed in claim 2, in which the overlapping flange has a curved leg portion which is positioned adjacent to the surface, the surface and the curved leg portion of the overlapping flange interposing therebetween the second lip portion.

6. The combination as claimed in claim 2, in which the overlapping flange has a curved leg portion.

7. The combination as claimed in claim 6, in which a drip moulding for a rain gutter of the upper section of the vehicle body structure has a leg portion extending from the exterior into the space, the leg portion of the drip moulding being positioned adjacent to the curved leg portion and being formed with the surface, the surface and the curved leg portion of the overlapping flange interposing therebetween the second lip portion of the weather strip.

8. The combination as claimed in claim 6, in which a roof drip extending outwardly from the jamb flange to form the overhanging flange is formed with the surface, the surface and the curved leg portion of the overlapping flange interposing therebetween the second lip portion of the weather strip.

9. A weather strip of an elogated resiliently deformable strip having a uniform cross section, comprising:
a base portion with a first bulbous bead along one side adjacent the bottom face thereof and with a second bulbous bead along the top face adjacent the opposite side thereof:
a first lip portion integrally formed along the top face adjacent the one side of said base portion and extending laterally beyond the one side of said base portion, said first lip portion having a sealing area along one side wall thereof; and
a second lip portion integrally formed along the opposite side wall of said first lip portion, said second lip portion extending from said first lip portion laterally relative thereto.

10. A weather strip of an elongated resiliently deformable strip having a uniform cross section, comprising:
a base portion with a first bulbous bead along one side adjacent the bottom face thereof and with a second bulbous bead along the top face adjacent the opposite side thereof;
a first hollow lip portion integrally formed along the top face adjacent the one side of said base portion, said first lip portion having a sealing area along one side wall thereof; and
a second hollow lip portion integrally formed along the opposite side wall of said first lip portion and directed laterally relative to said first lip portion.

11. A weather strip of an elongated resiliently deformable strip having a uniform cross section, comprising:
a base portion with a first bulbous bead along one side adjacent the bottom face thereof and with a second bulbous bead along the top face adjacent the opposite side thereof;
a first lip portion integrally formed along the top face adjacent the one side of said base portion and extending laterally beyond the one side of said base portion, said first lip portion having a sealing area along one side wall thereof; and
a second lip portion integrally formed along the opposite side wall of said first lip portion, said second lip portion extending from said first lip portion in substantially in parallel therewith.

* * * * *